United States Patent
Deans et al.

(10) Patent No.: US 7,261,162 B2
(45) Date of Patent: Aug. 28, 2007

(54) SUBSEA COMMUNICATIONS SYSTEM

(75) Inventors: Gregor E. Deans, Houston, TX (US); Roderick MacKenzie, Sugar Land, TX (US); John A. Kerr, Sugar Land, TX (US); David J. Mathis, Houston, TX (US); Eric Smedstad, League City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 287 days.

(21) Appl. No.: 10/641,652

(22) Filed: Aug. 15, 2003

(65) Prior Publication Data

US 2004/0262008 A1 Dec. 30, 2004

Related U.S. Application Data

(60) Provisional application No. 60/482,382, filed on Jun. 25, 2003.

(51) Int. Cl.
*E21B 47/00* (2006.01)
*G01V 3/00* (2006.01)

(52) U.S. Cl. .............. 166/336; 166/250.01; 340/853.3; 340/856.3

(58) Field of Classification Search ............... 166/336, 166/368, 250.01; 340/853.1–853.3, 853.9, 340/854.7, 856.3
See application file for complete search history.

(56) References Cited

U.S. PATENT DOCUMENTS

| | | | |
|---|---|---|---|
| 5,331,318 A | 7/1994 | Montgomery | |
| 5,597,042 A | 1/1997 | Tubel et al. | |
| 5,662,165 A | 9/1997 | Tubel et al. | |
| 5,706,892 A | 1/1998 | Aeschbacher, Jr. et al. | |
| 5,706,896 A | 1/1998 | Tubel et al. | |
| 5,721,538 A | 2/1998 | Tubel et al. | |
| 5,730,219 A | 3/1998 | Tubel et al. | |
| 5,732,776 A | 3/1998 | Tubel et al. | |
| 5,803,167 A | 9/1998 | Bussear et al. | |
| 5,868,201 A | 2/1999 | Bussear et al. | |
| 5,934,371 A | 8/1999 | Bussear et al. | |
| 5,941,307 A | 8/1999 | Tubel | |
| 5,959,547 A | 9/1999 | Tubel et al. | |
| 5,975,204 A | 11/1999 | Tubel et al. | |
| 5,992,250 A | 11/1999 | Kluth et al. | |
| 6,006,832 A | 12/1999 | Tubel et al. | |
| 6,012,015 A | 1/2000 | Tubel | |
| 6,046,685 A | 4/2000 | Tubel | |
| 6,068,053 A * | 5/2000 | Shaw | 166/267 |
| 6,075,462 A | 6/2000 | Smith | |
| 6,125,938 A | 10/2000 | Garcia-Soule et al. | |

(Continued)

FOREIGN PATENT DOCUMENTS

GB    2 284 257 A    5/1995

(Continued)

*Primary Examiner*—Thomas A Beach
(74) *Attorney, Agent, or Firm*—Trop, Pruner & Hu, P.C.; Jaime A. Castaño; Bryan P. Galloway

(57) ABSTRACT

A subsea communications module includes an interface to communicate with a surface facility over a communications link using a packet-based protocol. The communications link can be implemented with a fiber optic line, wire-based line, and/or other types of communications lines.

56 Claims, 7 Drawing Sheets

U.S. PATENT DOCUMENTS

| | | | |
|---|---|---|---|
| 6,160,492 A | 12/2000 | Herman | |
| 6,161,618 A | 12/2000 | Parks et al. | |
| 6,176,312 B1 | 1/2001 | Tubel et al. | |
| 6,179,057 B1 | 1/2001 | Fontana et al. | |
| 6,192,980 B1 | 2/2001 | Tubel et al. | |
| 6,192,988 B1 | 2/2001 | Tubel | |
| 6,209,640 B1 | 4/2001 | Reimers et al. | |
| 6,247,536 B1 | 6/2001 | Leismer et al. | |
| 6,257,332 B1 | 7/2001 | Vidrine et al. | |
| 6,271,766 B1 | 8/2001 | Didden et al. | |
| 6,276,454 B1 | 8/2001 | Fontana et al. | |
| 6,279,660 B1 * | 8/2001 | Hay | 166/336 |
| 6,281,489 B1 | 8/2001 | Tubel et al. | |
| 6,288,975 B1 | 9/2001 | Frederick et al. | |
| 6,296,066 B1 | 10/2001 | Terry et al. | |
| 6,422,315 B1 * | 7/2002 | Dean | 166/339 |
| 6,469,636 B1 * | 10/2002 | Baird et al. | 340/854.9 |
| 6,498,988 B1 * | 12/2002 | Robert et al. | 702/6 |
| 6,622,799 B2 * | 9/2003 | Dean | 166/381 |
| 6,670,880 B1 * | 12/2003 | Hall et al. | 336/132 |
| 6,717,501 B2 * | 4/2004 | Hall et al. | 336/132 |
| 6,788,980 B1 * | 9/2004 | Johnson | 700/1 |
| 6,801,135 B2 * | 10/2004 | Schultz et al. | 340/853.1 |
| 6,816,082 B1 * | 11/2004 | Laborde | 340/853.3 |
| 6,851,444 B1 * | 2/2005 | Kohl et al. | 137/13 |

FOREIGN PATENT DOCUMENTS

| | | |
|---|---|---|
| GB | 2284257 | 5/1995 |
| GB | 2 361 597 A | 10/2001 |
| GB | 2361597 | 10/2001 |
| WO | WO98/07049 A2 | 2/1998 |
| WO | WO98/20506 A1 | 5/1998 |
| WO | WO01/54140 A1 | 7/2001 |
| WO | WO 02/06716 | 1/2002 |

* cited by examiner

SUBSEA COMMUNICATIONS SYSTEM

CROSS-REFERENCE TO RELATED APPLICATION

This application claims the benefit of U.S. Provisional Application No. 60/482,382 filed Jun. 25, 2003.

FIELD OF INVENTION

This invention relates to communications with a subsea well, and in particular, communications with sensors and/or control devices associated with the subsea well.

BACKGROUND

As technology has improved, various types of sensors and control devices have been placed in hydrocarbon wells, including subsea wells. Examples of sensors include pressure sensors, temperature sensors, and other types of sensors. Additionally, sensors and control devices on the sea floor, such as sand detectors, production sensors and corrosion monitors are also used to gather data. Information measured by such sensors are communicated to well surface equipment over communications links. Control devices can also be controlled from well surface equipment over a communications link. Examples of control devices include flow control devices, pumps, choke valves, and so forth.

Certain solutions exist to communicate control and data information between subsea wellhead equipment and a surface facility (such as a sea vessel or a land-based facility). Conventionally, the communications link between the subsea wellhead equipment and the surface facility is implemented with electrical wires run in an umbilical from the subsea wellhead equipment to the surface facility.

Communications of data and control information over such electrical wires are usually defined by proprietary protocols that differ by well operator. A shortcoming of modems that communicate using such conventional proprietary protocols is that the communication bandwidth can be rather limited. For example, in one conventional wire-based subsea communications link defined according to a proprietary protocol, the data rate over the communications link is 9600 bits per second.

As sensors and control devices have become more complex and the number of such devices has increased in subsea wells, the amount of data that is transferred over the umbilical communications link between the subsea wellhead equipment and the surface facility can be quite large. Conventional umbilical communications links do not offer the bandwidth that allows for the transfer of large amounts of data over the links. Therefore, the types and number of sensors and/or control devices that can be used in subsea applications or the communication rate of sensor data or control commands may be limited.

SUMMARY

In general, methods and apparatus provide an open communications network for downhole and seabed monitoring and control and to enhance the bandwidth of communications links between subsea wellhead equipment and a surface facility. For example, a method for use with a subsea well includes providing a subsea communication module that is coupled to surface equipment using a communications link. Data is received from at least one sensor at the subsea communication module. The received data is sent in packets over the communications link according to a packet-based protocol to the surface equipment.

Other or alternative features will be apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1A:
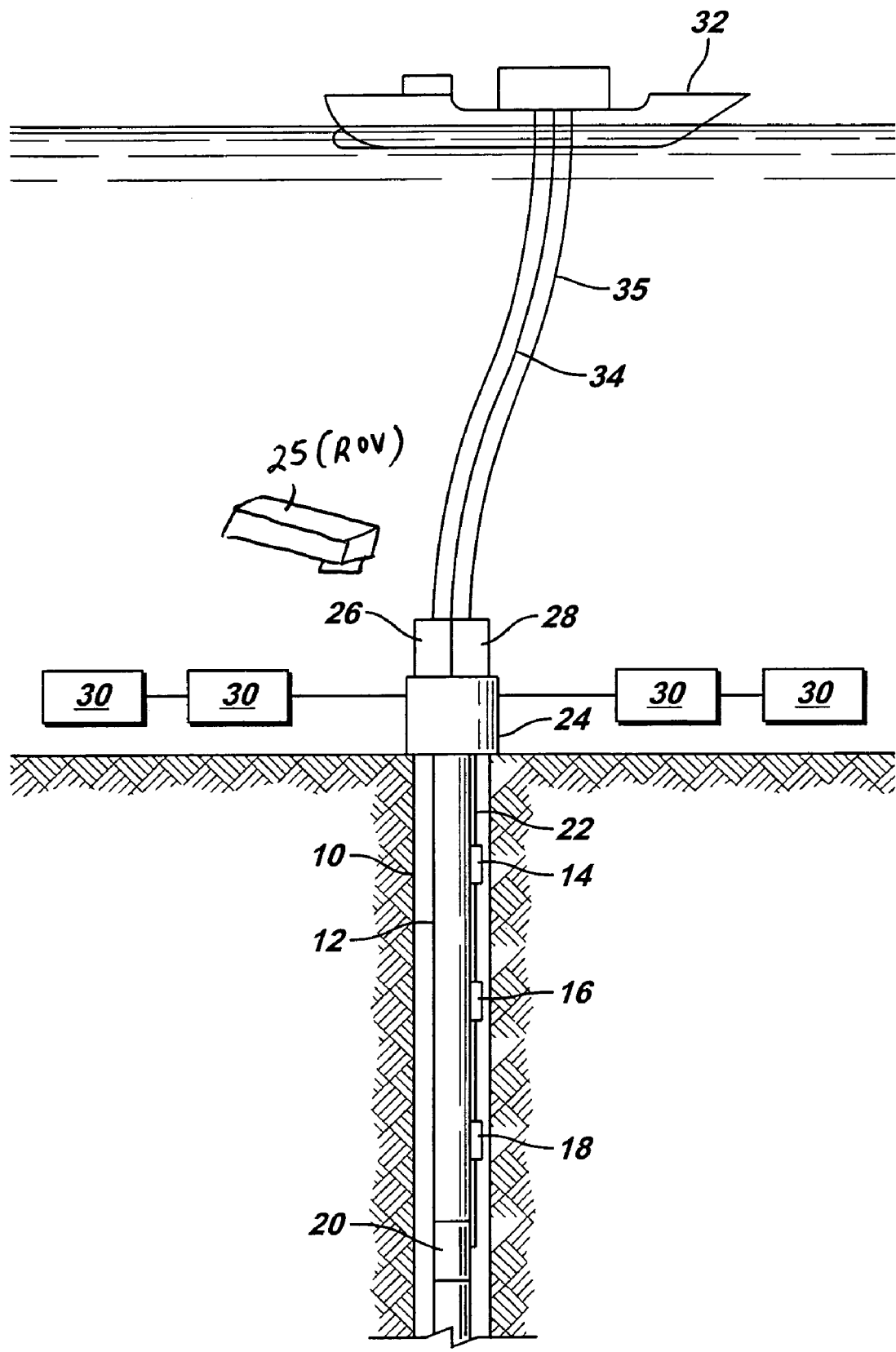
FIGS. 1A–1B illustrate example arrangements of a subsea monitoring and control (SMC) system that includes subsea communication hub(s) and a surface facility.

FIG. 1A illustrates an example arrangement of a subsea environment, which includes a subsea well 10 in which completions equipment is installed. The completions equipment includes a production conduit 12, such as production tubing. Also, various sensors 14, 16, 18 and control devices 20 are positioned downhole in the subsea well 10. Examples of sensors 14, 16, 18 include pressure sensors, temperature sensors, flow rate sensors, shock detectors, and so forth. Examples of control devices 20 include a flow control device (e.g., a valve), a pump, and so forth. The sensors 14, 16, 18, and the control device 20 are coupled by a downhole communications link 22. The communications link 22 can be an electrical cable, a fiber optic line, or some form of a wireless communications link.

The communications link 22 extends to subsea wellhead equipment 24, such as a subsea tree. Installed, as part of the subsea wellhead equipment 24 is a subsea production control system 26 and a subsea communication hub 28. Although shown as two separate components in FIG. 1, the subsea control system 26 and the subsea communication hub 28 can be incorporated into one system. In another embodiment, the subsea control system 26 can be omitted with monitoring and control functions provided by the subsea communication hub 28.

Also, various types of sensors and/or control devices 30 are placed at the seabed, either in the subsea wellhead equipment, at flow conduits arranged on the seabed, on a hydrocarbon-gathering manifold, a water-injection manifold, or elsewhere above the mud line but below the sea surface. The sensors and/or control devices 30 include, as examples, a corrosion monitor, a sand monitor, a subsea flow meter, a pump, a flow line measurement sensor, a seabed acoustic sensor, a seabed seismic sensor, and so forth. The various subsea sensors and/or control devices 30 are also coupled to the subsea production control system 26.

The subsea production control system 26 is responsible for providing control commands to the various subsea sensors and/or control devices or downhole sensors and/or control devices. The production control system 26 may also provide commands to wellhead components, such as xmas tree valves. A subsea device (such as a subsea sensor or a subsea control device) refers to a device located above the mud line but below the sea surface. A downhole device refers to a device placed in a wellbore. More generally, a device (such as a sensor or a control device) associated with a subsea well refers to either a subsea device or a downhole device.

In one example implementation, the subsea control system 26 is able to receive measurement data from one or more of the sensors associated with a subsea well for communication to a surface facility 32 over a communications link 34. The communications link 34 is provided through an umbilical 35 extending from the subsea wellhead to the surface facility 32. Usually, hydraulic and other control lines are also provided through the umbilical 35.

The communications link 34 can be implemented with electrical wires (e.g., copper wires), fiber optic lines, or, other types of communications lines (whether wired or wireless). The subsea control system 26 has a communications interface that employs a proprietary communications protocol for communicating data between the subsea control system 26 and a surface facility 32. The proprietary protocol is specific to a wellhead equipment manufacturer, and often differs by wellhead equipment manufacturer. The bandwidth provided by the communications link between the subsea production control system 26 and the surface facility 32 can be rather limited due to the use of such proprietary communications. Also, flexibility is reduced because different wellhead equipment manufacturers employ different communications protocols, and as a result, equipment made by one manufacturer cannot be used by another manufacturer and the engineering required to interface the subsea and downhole devices increases.

In accordance with some embodiments of the invention, a subsea communication hub 28 has a communications interface that uses a non-proprietary communications protocol for communicating information (control and/or data) between the subsea communication hub 28 and the surface facility 32. The non-proprietary communications protocol used by the subsea communication hub 28 is a packet-based protocol that communicates data in packets exchanged between the subsea communication hub 28 and the surface facility 32. In one embodiment, the packet-based protocol is the Internet Protocol (IP). In other embodiments, other established packet-based protocols can be employed.

IP is a protocol that defines formatting for packets that are communicated between various nodes over a network. Each packet includes a payload section for carrying the packet payload (e.g., control and data information communicated with subsea sensors and/or control devices), as well as a header section for carrying packet control information, such as a destination IP address, a source IP address, and other packet control information. The source IP address specifies the IP address of the source node (the node that originates the message) and the destination IP address specifies the IP address of the destination node (the node receiving a packet). Routing of packets between a source node and a destination node is based on the source and destination addresses.

In the ensuing discussion, the communications link 34 between the subsea communication hub 28 and the surface facility 32 is referred to as a "network." As noted above, the network can be a wire-based network or a fiber optic-based network.

The IP packets are carried over the underlying physical transmission medium that makes up the communications link 34. In some implementations, a data link layer, such as Ethernet, is also provided to define frames (e.g., Ethernet frames) in which the IP packets are carried.

In addition, a transport layer in the subsea communication hub 28 is provided for managing communications over an IP-based network. One example transport layer is the Transmission Control Protocol (TCP). However, in addition to TCP, it is contemplated that other transport layers can be employed, such as the User Datagram Protocol (UDP). A transport layer and IP layer in the subsea communication hub 28 enables the communication of TCP/IP or UDP/IP information packets over the network 34.

The communications link 22 coupling the downhole sensors and control devices can also implement a packet-based communications protocol, such as TCP/IP. Similarly, the communications protocol of the link coupling the seabed sensors and/or control devices can also be a packet-based protocol. A benefit offered by this is that the surface facility 32 can directly communicate with the downhole sensors and/or control devices without translation between different communications protocols by the subsea communication hub 28. Each sensor and/or control device can be considered an independent network node on an IP network, with the sensor and/or control device assigned an IP address for purposes of communications.

In the example arrangement shown in FIG. 1A, the subsea production control system 26 and the subsea communication hub 28 share the same network 34 for communications with the surface facility 32. This can be accomplished, by allowing the subsea production control system 26 to communicate over the subsea communication hub network or by using signaling of different frequencies to carry data over a common physical channel (e.g., an electrical wire or sets of wires or an optical fiber). For a fiber optic link, the subsea production control system 26 and the subsea communication hub 28 can use different fiber cores to communicate. While communication is possible over the limited bandwidth path between the subsea production control system 26 and the surface facility 32, the subsea communication hub 28 offers a much higher bandwidth communications path. The increased bandwidth provided by the subsea communication hub 28 allows more sophisticated and a greater number of sensors and/or control devices to be associated with subsea wells. Also, the increased bandwidth and data rates enable real-time data monitoring at the host (such as a host in the surface facility 32).

In an alternative embodiment, instead of sharing the same communications link 34, the subsea production control system 26 and the subsea communication hub are each coupled by a dedicated communications link to the surface facility 32.

Collectively, the sensors and/or control devices associated with subsea well(s), the storage facility 32, the subsea control system 26, the subsea communication hub 28, and the network 34 are referred to as a subsea monitoring and control (SMC) system. Effectively, the SMC system forms a network that provides connectivity to multiple sensors and control devices (from reservoir to host), which provides subsea and downhole data and control in a seamless manner.

By using a packet-based protocol interface, subsea and/or downhole devices can share a common interface design. This is an improvement over conventional systems in which a variety of interface designs are required in subsea and/or downhole devices to customize the devices based on the architecture of the subsea production control system 26.

The following are features provided by some embodiments of the subsea communication hub 28. Note that the following features are optional features, with some or all of such features being omitted in other embodiments of the subsea communication hub. In configurations in which the subsea communication hub 28 is separate from the subsea production control system 28, the operation of the subsea communication hub 28 is independent of well control operations typically performed by the subsea production control system 26. As a result, the subsea communication hub 28 can be removed from operation for service or repair without detrimental effects upon ongoing well production. Removal and replacement of the subsea communication hub 28 is performed with a remote-operated vehicle (ROV) 25, remote-operated tool (ROT), an intervention vessel, or by diver. Note that a benefit provided by keeping the subsea communication hub 28 separate from the subsea production control system 26 is that removal of the subsea communication hub 28 does not affect well shut-in. Also, the subsea communication hub 28 "unburdens" the subsea production control system 26 by taking over the responsibilities of processing and transmission of instrumentation data. This allows the subsea production control system 26 to focus on its primary functionality, which is providing safety control in the production of hydrocarbons.

Also, the subsea communication hub 28 has the capability of subsea data storage should be communications link to the surface facility 32 be temporarily disabled. Upon restoration of the communications link, full data retrieval is possible (based on storage capacity in the subsea communication hub 28). Additionally, the subsea communication hub 28 has the capability of interfacing with an alternative communication system, such as an acoustic telemetry system, that can be activated should the primary communication network 34 be damaged or unavailable. The subsea diagnostic and processing capability of the subsea communication hub 28 can automate this process. The acoustic telemetry system provides subsea wireless communications, and optionally, can also provide an acoustic network for underwater global position system (for ROVs, intervention gear, divers, and so forth).

The subsea communication hub 28 provides a transparent communication portal between the downhole and/or subsea instruments and the surface facility 32. In addition, the subsea communication hub 28 can be configured to conduct autonomous processing of data and control based upon input from a single or multiple instruments. The subsea communication hub 28 can also be configured to conduct autonomous processing of data and pass along warnings to the subsea production control system 26, based upon preset criteria.

For example, the subsea communication hub 28 can be configured to trigger on predefined subsea events, such as choke adjustments or valve closures. The subsea communication hub 28 will recognize the event and activate a trigger without operator intervention (based on a predefined activity matrix). The triggers can include increased data sampling rates, and/or compilations of data sets to develop data products such as pressure build up curves as well as fault prediction and failure avoidance functionality. Also, the subsea communication hub 28 has the capability of accepting a software download from the surface facility 32 of autonomous processing and action criteria. Software downloads from the surface facility 32 to the subsea communication hub 28 can also be performed to revise instrumentation calibration factors.

The subsea communication hub 28 also has on-board diagnostic capabilities at the seabed. On-board diagnostics can be configured to send alerts to the surface facility 32 or to trigger some automated subsea event such as a downhole flow control device actuation or increased data acquisition log in rates to due flow interruptions or restarting.

The subsea communication hub 28 can provide subsea data processing and control from instrumentation that can be used to provide real-time and automated optimization of artificial lifting of hydrocarbons from the wellbore. The criteria for adjusting artificial lifting is based on instrumentation inputs and preset algorithms. The subsea communication hub 28 can provide subsea data processing and control from instrumentation that can be used to provide real-time and automated optimization of chemical injection rates into the wellbore and hydrocarbon gathering lines. The criteria for adjusting chemical injection is based on instrumentation inputs, and preset algorithms.

Other possible applications include one or more of the following. The SMC system can provide pigging recommendation based on inputs of operating temperature, production composition, time, rate, and pressure, acquired by the system. Due to enhanced data rates, pattern recognition models can be performed to determine trends for future events, such as water breakthrough and so forth. Also, increased data rates enable multi-zone production rate allocation. Subsea instrumentation data can be used to affect real-time gas lift optimization at the seabed by use of closed loop control on the seabed. Also, subsea instrumentation of a pump, such as an ESP pump, can be used to change frequency, monitor vibration, optimize speed at the seabed and extend pump life.

Closed loop control capabilities of the SMC system can be used to monitor for sand production, to adjust choke settings at the seabed, and to prevent flow line erosion and damage. Also, closed loop control capabilities of the SMC system can be used to optimize subsea/downhole separation operation, optimize chemical injection rate based upon inputs of temperature, production type, and flow rate, optimize corrosion inhibitor dosing based upon subsea corrosion monitoring devices. Multi-phase flow meter performance can be improved by on-line calibration and downloads of updated algorithms. An algorithm can be developed based on chemical injection, ESP pump operation, choke settings, to optimize start-up or shut down of a subsea well.

Due to the high data capacity of the SMC system, subsea visualization via acoustics/sonar vision or infrared visualization is enabled. Flowline heating is optimized with inputs of temperature and produced fluid chemistry.

To provide security, encryption can be employed to protect communications between subsea and/or downhole device and the surface facility 32. A virtual private network can also be used over the subsea network to provide security.

For improved performance, the communication interfaces can operate at multiple baud rates, as well as perform simultaneous transmission over the subsea network. If fiber optic links are used, the SMC system can boost optical signals to extend the step out range of the subsea communication network.

Other embodiments of the invention can provide for other features. For example, in an SMC system for multiple wells, a subsea data network having redundant data communication paths is provided to increase system reliability. The subsea data hub 28 has the ability to hand off data to the subsea production control system 26 at the wellhead and to delegate the responsibility of data transfer to the host to the subsea production control system 26. The subsea communication hub 28 can be configured to provide interpretation and processing of DTS signals and to transmit the result to the host (at the surface facility 32) or to hand off data to the production control system 26. The subsea communication hub 28 can be configured to provide monitoring, processing, and transmission for subsea instrumentation associated with a subsea booster pumping system.

Additionally, the subsea communication hub 28 can provide communication and processing to multiple subsea wells in close proximity to each other, such as would be seen in an development based on the use of multi-well drilling template. The subsea communication hub 28 can provide power and communications conduit to the subsea production control system 26. The subsea communication hub 28 can communicate with the surface over electrical lines if no fiber optic communication lines are present.

The subsea communication hub 28 has the ability to store data until a vessel can retrieve the data via temporary installation of an umbilical or otherwise establishing communication such as by use of acoustics or other wireless mechanisms.

Figure 1B:
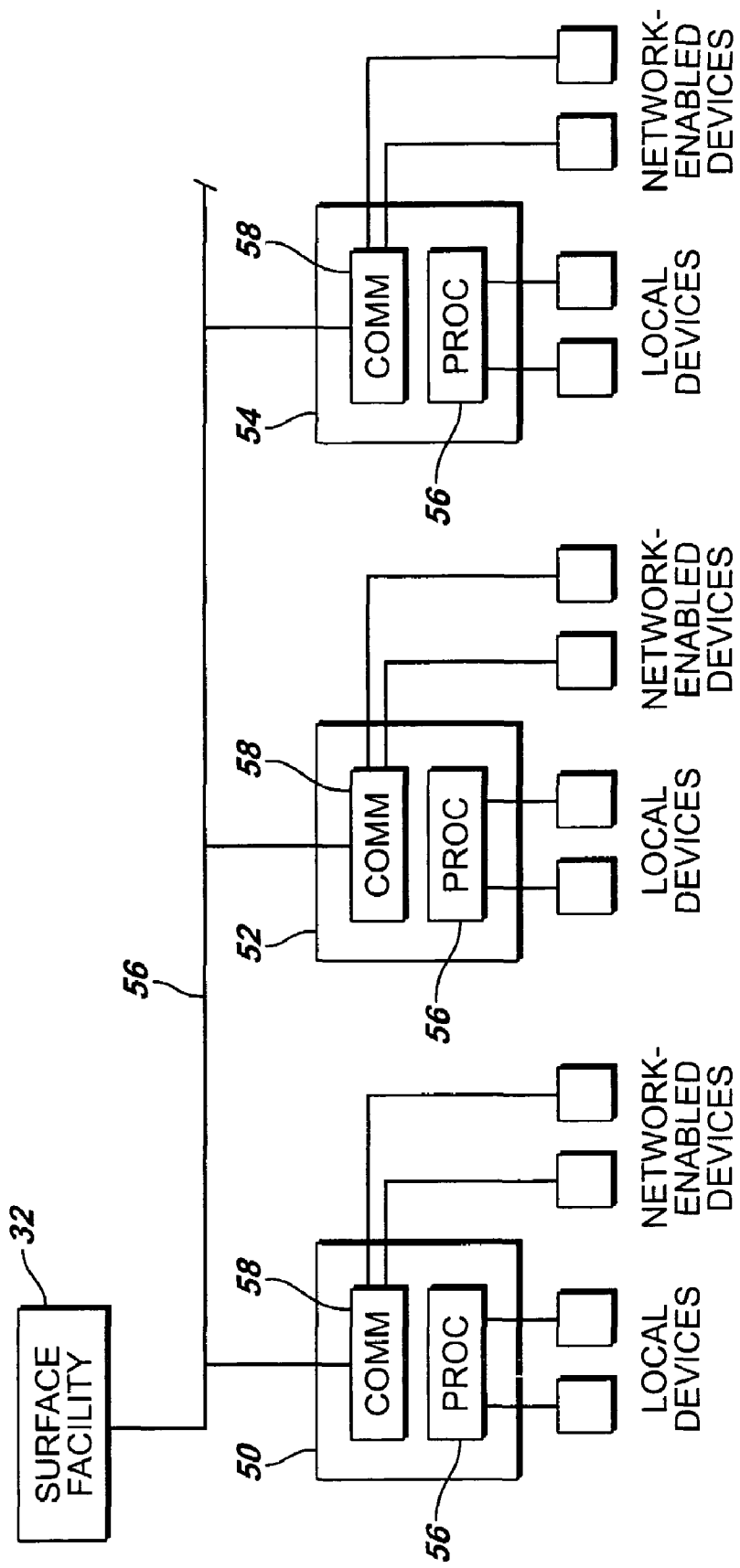

FIG. 1B illustrates another embodiment of the subsea monitoring and control system that has multiple subsea communication hubs 50, 52, and 54 that are coupled by a subsea network 56 to the surface facility 32. The subsea communication hubs 50, 52, and 54 each has a processor 56 as well as communication equipment 58. Each subsea communication hub can be attached to either local or network-enabled sensors and/or control devices. A local sensor and/or control device is capable of communication only with the respective subsea communication hub. In other words, the surface facility, or another subsea communication hub cannot directly access the local device. On the other hand, a network-enabled sensor and/or control device is associated with network addresses on the subsea network 56, and thus the surface facility 32 and other nodes on the other subsea network 56 are capable of addressing such network-enabled devices directly. For example, the surface facility 32 can send packets containing the destination address of the network-enabled device, with the packets routed over the subsea network 56 and through a subsea communication hub, which in this case acts as a network router. The communications equipment 58 in each subsea communication hub provides a TCP/IP interface to network-enabled monitoring devices, in accordance with one embodiment. Such a feature allows third party devices to communicate directly from the surface facility 32 to the subsea network-enabled devices.

Also, the subsea communications network provided through the communications interface 58 is independent of the processor 56 in each subsea communication hub 50, 52, and 54. This allows the surface facility 32 (or other surface devices) to communicate with network-enabled devices even though the processor in a particular subsea communication hub has failed.

The independent subsea communication hubs 50, 52, and 54 can share functionality, such as shared data storage or processing capabilities, if the need arises. For example, processing of large data arrays or performing complex processing can be split into smaller tasks that are executed concurrently by multiple processors 56 in respective subsea communication hubs.

Also, in the event of processor failure within one subsea communication hub, the processor in another subsea communication hub can take over input/output and communication tasks performed by the subsea communication hub with the failed processor. This provides redundancy to enable continued operation despite node failure.

To further improve performance of communications over the subsea network (34 in FIG. 1A or 56 in FIG. 1B), a subsea communication hub is able to perform various tasks, such as data buffering, pre-processing of data, or compression of data, at the seabed prior to transmission over the communications network to the surface facility 32. This improves network bandwidth and increases the range of data monitoring scope. For example, the subsea communication hub can be used in the acquisitions and transmission of three-dimensional or four-dimensional seismic data.

Figure 2A:
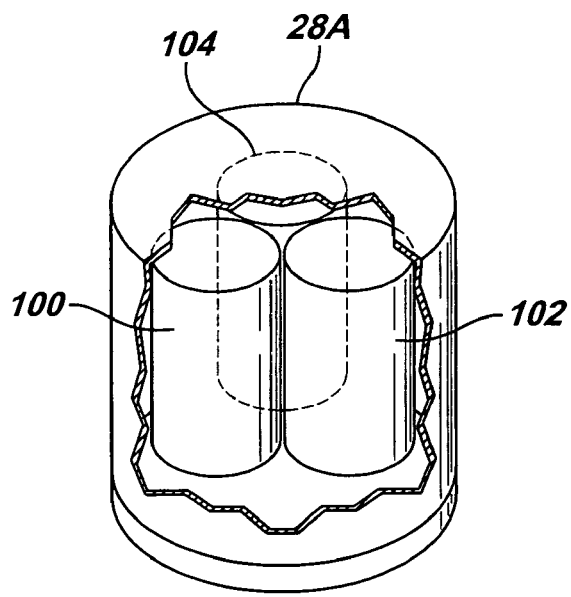
FIGS. 2A–2C illustrate three embodiments of communication hubs used for communicating control and data information with sensors and control devices associated with the subsea well.
Figure 2B:
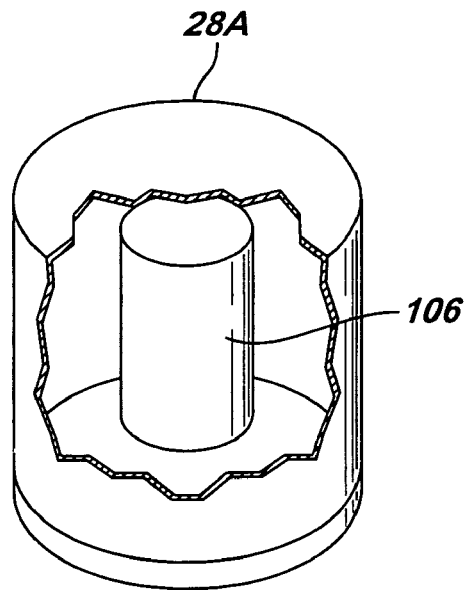

FIGS. 2A and 2B illustrate two different types of subsea communication hubs 28. FIG. 2A illustrates a multi-well subsea communication hub 28A, while FIG. 2B illustrates a single-well subsea communication hub 28B. The multi-well subsea communication hub 28A includes multiple communication pods 100, 102, and 104, with each pod containing communications components for communicating with a number of wells (a different embodiment of a multi-pod communication hub is described further below in FIG. 2C).

The benefit offered by the multi-well subsea communication hub 28A is that one hub offers a communications solution for multiple wells. Thus, for example, in a subsea region where multiple wells are located in close proximity to each other, the multi-well subsea communication hub 28A can be employed. However, for a well that is located some distance from other wells, the single-well subsea communication hub 28B can be employed.

Figure 2C:
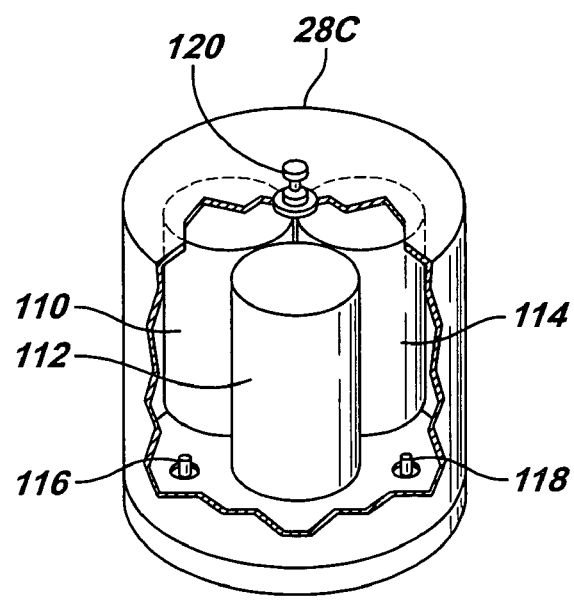

Another embodiment of a multi-well subsea communication hub 28C is illustrated in FIG. 2C. The subsea communication hub 28C includes multiple pods 110, 112, and 114 that are contained in an enclosure defined by a housing (e.g., a stainless steel housing). Other materials can be employed for the housing in other embodiments. In one example, the enclosure within the housing of the communication hub 28A is filled with a fluid, such as pressure-compensated oil. In the subsea communication hub 28C, the three pods 110, 112, and 114 contain different components to enable subsea monitoring and control functions. For example, the container 112 may include a power supply, the container 114 may include a processor, and the container 110 may include communications components. Also, connectors 116 and 118 are provided at the bottom surface within the enclosure of the communication hub 28C.

By using the separate pods, high power (and thus high heat) components can be separated from other heat-sensitive components. Also, separation into separate pods can reduce electromagnetic interference (EMI) with other assemblies.

A further feature of some embodiments is that space and regulated power can be provided for third-party proprietary electronic interface cards and processors. Also, the processor, communications, and I/O card within the subsea communication hub 28 can be module-based to allow a number of different configurations of the subsea communication hub 28.

Also, in some embodiments, the communication hub 28 may have a number of internal diagnostic sensors to monitor pressure, temperature, and humidity in the hub 28 to detect internal environmental conditions. This enables a remote operator to check for unusual conditions in the communication hub 28 that may lead to its failure.

In addition, the communication hub-28 includes an ROV (remote-operated vehicle) interface 120 to enable an ROV to mount the communication hub 28 to the wellhead equipment.

Figure 3:
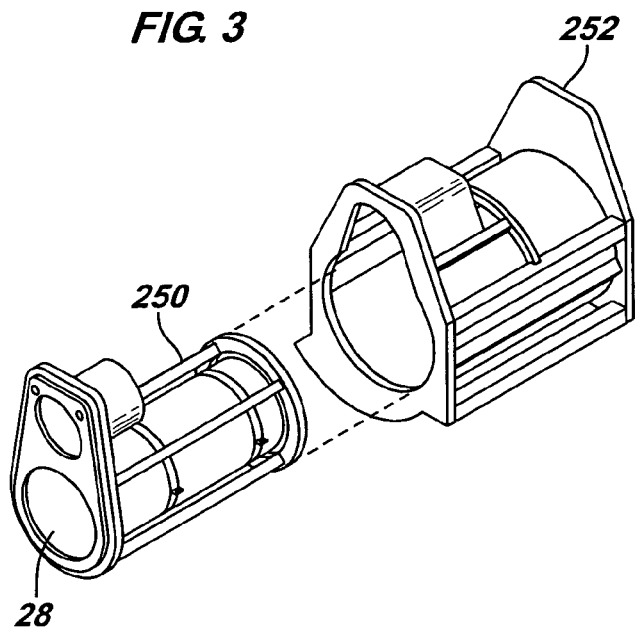
FIGS. 3 and 4 illustrate installation of a communication hub.
Figure 4:
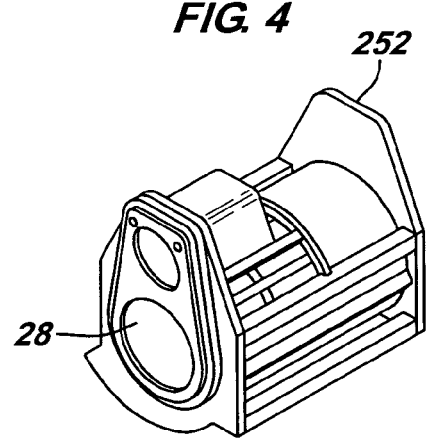

FIG. 3 shows the communication hub 28B located within an ROV deployment cage 250. To install the communication hub 28B at the subsea wellhead equipment, an ROV carries the assembly of the ROV deployment cage 250 and the communication hub 28B to the subsea wellhead equipment. The subsea wellhead equipment includes a receiving structure 252 to receive the assembly of the communication hub 28B and the ROV deployment cage 250. FIG. 4 shows the communication hub 28B and ROV deployment cage 250 located inside the receiving structure 252.

Figure 5:
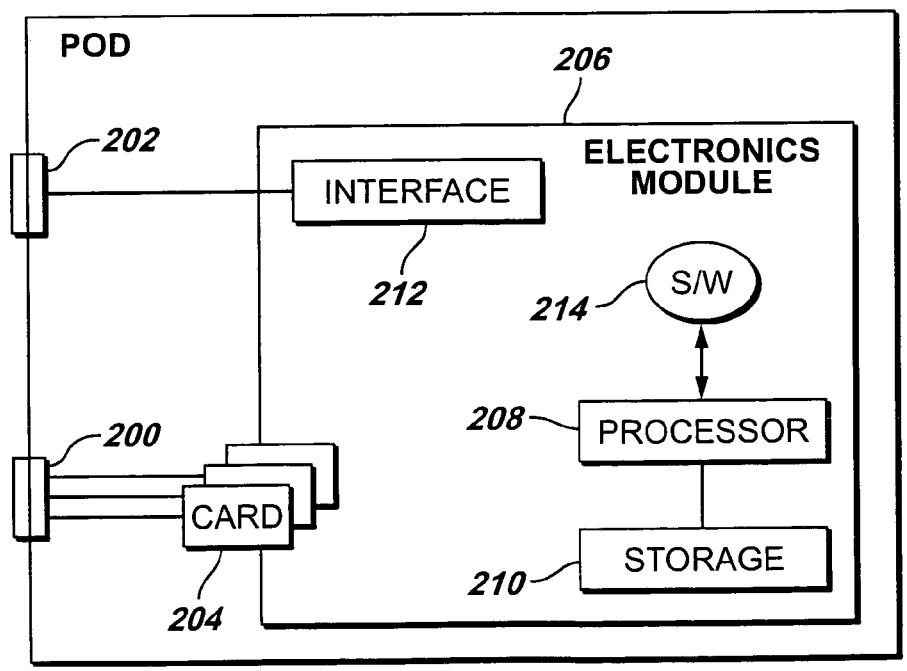
FIG. 5 is a block diagram of a communications pod in the communication hub of FIG. 2A or 2B.

As shown in FIG. 5, a communication pod includes various components, including a device connector 200 that is connected to one or more communications lines to various subsea or downhole sensors and/or control devices. The pod also has a network connector 202 for connection to the subsea network 34. The device connector 200 is connected to one or more cards 204, with each card associated with a particular device. Thus, for example, if there are N subsea or downhole devices that the pod is coupled to, then there would be N cards 204 provided in the pod. Alternatively, one card can be provided to communicate with multiple sensors or control devices. In cases where no card is required, lines from the device connector will be connected directly to the electronics module 206.

The cards 204 are coupled to an electronics module 206. For example, the electronics module 206 can have slots to receive the multiple cards 204. The electronics module 206 includes a processor 208 and storage 210, such as random access memory (RAM), mass storage, and so forth. Also, the electronics module 206 may include software 214 that is executable on the processor 208. Alternatively, the tasks performed by the electronics module 206 can be implemented entirely in hardware without the use of software.

The electronics module 206 also includes an interface 212 that is coupled to the network connector 202. The interface 212 enables the pod to communicate according to packet-based communications (e.g., TCP/IP-based communications) over the subsea network 34. The interface 212 includes the various layers that enable communications over the network, such as a physical layer, a data link layer (e.g., Ethernet layer), an IP layer, and a transport layer (e.g., TCP or UDP). More specifically, according to one example implementation, the interface 212 includes an Ethernet switch and an optical modem, as well as the TCP/IP stack for implementing TCP/IP communications.

During operation, data acquired by sensors are received over a line at the device connector 200, with such data provided to the electronics module 206 for storing in the storage 210. Periodically, or in response to some triggering event, the electronics module 206 (under control of the software 214 and/or processor 208) communicates the stored data through the interface 212 and the network connector 202 to the subsea network 34. The data is transferred over the subsea network 34 to the surface facility 32. Data and control information can also be communicated from the surface facility 32 for receipt by the pod.

In the outbound direction (from the pod over the network 34 to the surface facility 32), data in the storage 210 is packetized by the interface 212 into IP packets. Each IP packet contains a payload for carrying a certain amount of data. Thus, usually, data stored in the storage 210 are carried in multiple packets that are sent over the subsea network 34. In addition to the payload, packet control information is inserted into each packet, including IP source and destination addresses as well as TCP control information.

In the inbound direction (from surface facility to the pod), received IP packets are decapsulated by the interface 212 to extract the payload, which can contain control and/or data information to be communicated to subsea or downhole sensors and/or control devices.

Figure 6:
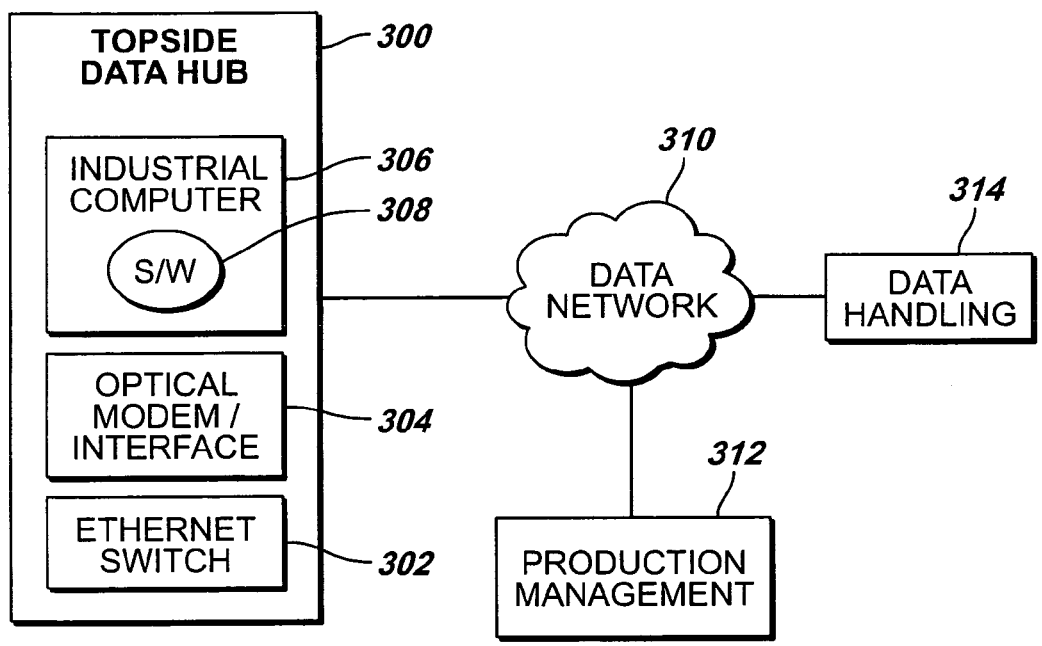
FIG. 6 is a topside communication hub in the surface facility for communication with the subsea communication hub.

FIG. 6 illustrates a topside communication hub 300 that is located at the surface facility 32. The topside communication hub includes the communications components to enable the surface facility 32 to communicate with the subsea communication hub 28 over the network 34. In one example implementation, the communications components in the topside communication hub 300 include an Ethernet switch 302 and an optical modem 304. In alternative embodiments, instead of an Ethernet switch, another type of module for implementing a data link layer can be used. Also, if the network 34 is a wire-based link, then another type of interface is used in place of the optical modem 304. The topside communication hub 300 also includes an industrial computer 306 on which various software modules 308 are executable. The computer 306 is the processing element for managing the communication of information between the surface facility 32 and the subsea communication hub 28. In addition, third party acquisition systems can integrate subsea/downhole devices over the network.

The topside communication hub 300 is also coupled over a data network 310 to various remote entities. For example, such remote entities may include a production management module 312, a data handling module 314, and/or other modules. Production management refers to the management of the production of one or more subsea wells. For example, a well operator may decide to increase or decrease the amount of production from one or more wells. The data handling module 314 refers to a module for collection and storage of data associated with sensors of the various wells. This may be implemented in a database to enable convenient user query and retrieval of measurement data, such as those collected by sensors associated with subsea wells.

The data network 310 can be a public network, such as the Internet, or an intranet, such as a local area network (LAN) or a wide area network (WAN). The data network 310 may also include various wireless links, such as satellite links, cellular communications links, and the like. The data network 310 enables convenient communication between remote users (such as those associated with the data handling module 314 or production management module 312) and the topside communication hub 300 (and ultimately the subsea communication hub 28).

Figure 7:
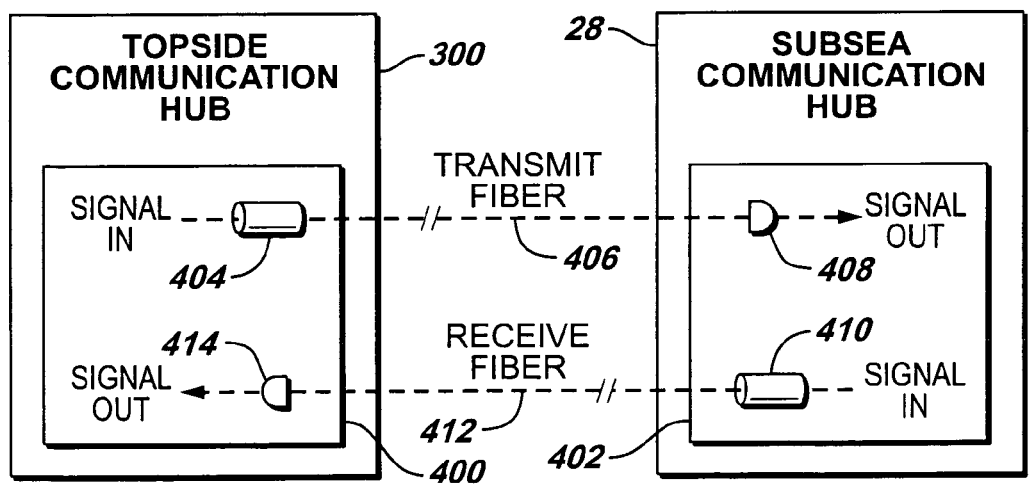
FIG. 7 is a block diagram of a first embodiment of a fiber optic communication system that can be implemented in the subsea monitoring and control system of FIG. 1.

FIG. 7 shows one arrangement of a fiber optic communication system that can be implemented in the subsea monitoring and control system described above. Note that other embodiments of fiber optic communication systems can be used, which are described further below. The fiber optic communication system of FIG. 7 includes a topside fiber optic modem 400 and a remote fiber optic modem 402. In the context of the subsea monitoring and control system, the topside modem 400 is implemented in the topside communication hub 300, while the remote modem 402 is implemented in the subsea communication hub 28.

The topside control system includes a fiber optic modem 400 that is capable of transmitting and receiving optical signals. A transmitter 404 receives an input signal from the topside communication hub that contains the information to be communicated down a transmit fiber 406 to the remote fiber optic modem 402. The fiber optic laser in the transmitter 404 transmits optical signals down the transmit fiber 406, with the optical signals modulated to be indicative of the data or commands that are being transmitted. A receiver 408 in the remote fiber optic modem 402 receives the optical signals from the transmit fiber 406, and demodulates the optical signals to provide a signal output for use by the subsea communication hub 28.

Figure 8:
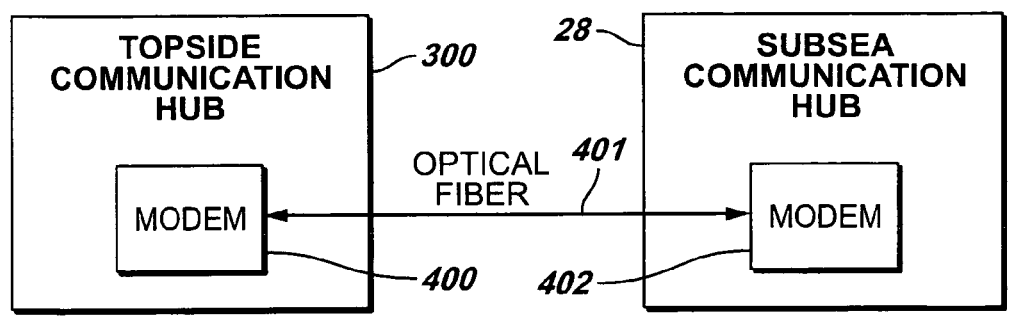
FIG. 8 is a block diagram of another embodiment of the fiber optic communication system of FIG. 7.

The remote fiber optic modem also contains an optical fiber transmitter 410 and receiver 408. The fiber optic modem 402 transmits optical signals through a receive fiber 412 from the remote fiber optic modem 402 to the topside fiber optic modem 400. The fiber optic laser 410 receives an input signal from the subsea communication hub 28, and in response, transmits optical signals through the receive fiber 412 that are indicative of the received input signal. At the other end, a receiver 414 in the control system 400 demodulates the received optical signals and provides an output signal for use by the topside communication hub 300. Note that the fiber optic modems 400 and 402 can combine their communications onto a single fiber optic line 401 (FIG. 8) by using different wavelengths (referred to as wavelength division multiplexing).

A discussed above, use of the packet-based protocol for communications over the network 34 between the topside communication hub 300 and the subsea communication hub 28 allows for relatively high-speed communications between the surface facility 32 and the sensors and/or control devices associated with subsea wells. In one example implementation, the communication components of the subsea monitoring and control system allows for 100Base-T Ethernet on TCP/IP. 100Base-T is an Ethernet standard that provides for communications at 100 Mbps (megabits per second) over a network. To support 100Base-T, an intra-modem optical communication rate of approximately 125 Mbps may be needed in an optical fiber. When using a standard class 1 optical laser with an output of 1 mW (millowatt), according to one example, 33 dB of optical attenuation over the optical fiber is allowed before a loss of communication occurs at the 125-Mbps optical communication rate.

Normally, in subsea applications, the intensity of optical signals in an optical fiber decreases over time due to fiber darkening, increases in fiber optic connector losses, or weakening of the transmitter over time. The intensity of the optical signal is measured by the optical modem. To compensate for reduction in the quality of the optical signals in the optical fiber, optical modems in the topside communication hub 300 and in the subsea communication hub 28 reduce the intra-modem optical communication rate. For example, the modem or a separate processor can auto-select a fast communication rate, a slow communication rate, or a very slow (serial) communication rate. An algorithm can be performed by the modem or processor to determine the optimal communication rate based on the amount of losses in the system at a particular time.

By reducing the data rate in an optical fiber that has degraded over time, failure of data communications can be avoided in most cases. However, the reduction of the intra-modem may cause 100Base-T Ethernet to no longer be supportable over the optical fiber. If the intra-modem optical communication rate drops too far, then 10Base-T Ethernet communication, instead of 100Base-T Ethernet communication, is provided. 10Base-T Ethernet, which provides for 10 Mbps data transfer rates, allows for greater attenuation to occur before losing functionality. In one implementation that uses a class 1 optical laser with an output of 1 mW, approximately 46 dB of attenuation can be tolerated. As further attenuation occurs, modems compensate by further reducing the optical data rate.

Thus, one feature according to some embodiments is that optical modems are able to adjust for degraded optical fiber links by reducing data rates. This enhances the likelihood that well operations can continue.

Figure 9:
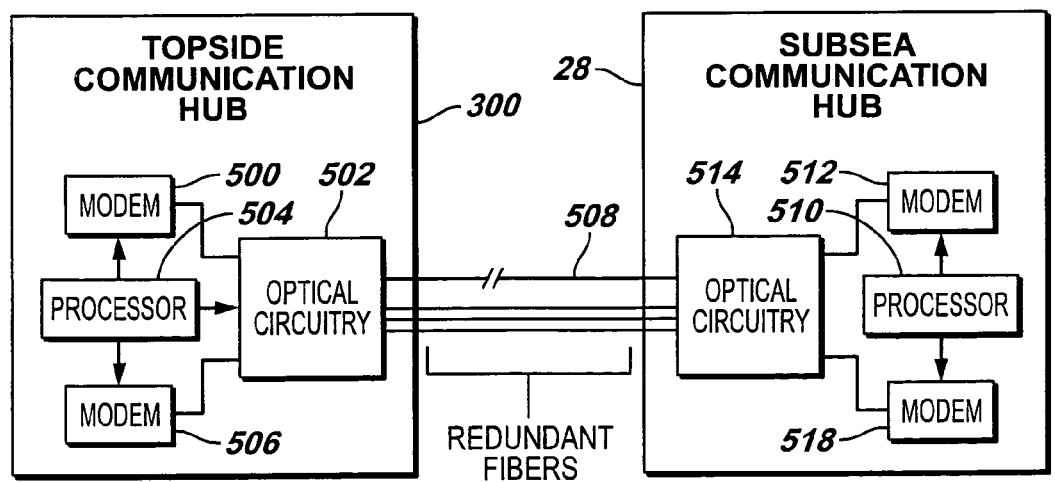
FIG. 9 is a block diagram of a fiber optic communication system that has a redundancy arrangement.

In some cases, reduction in optical data rates due to degradation of the optical fiber system may not be an optimal solution. Thus in such cases, instead of reducing optical data rates to compensate for degraded optical fiber links, an alternate optical modem (or optical modems) and optical fiber are selected to communicate optical signals over a fiber optical link if the redundant optical modem provides better performance. In one arrangement, dual optical modems are used in each of the topside communication hub 300 and the subsea communication hub 28. In this configuration, redundant optical modems are provided in the topside communication hub 300 and in the subsea communication hub 28. The redundancy configuration is illustrated in FIG. 9. At the topside communication hub 300 resides a first optical modem 500 and a second optical modem 506. Similarly, at the subsea communication hub 28 resides a first optical modem 512 and a second optical modem 518. The four optical modems provides four possible pairs of modems within one pair being selectable to provide the highest quality optical communication. In other embodiments, a larger number of redundant modems can be used.

A pair of optical modems is active at one time, with the other modems in a powered down or standby mode to increase life expectancy of those modems. The pair of active modems include one active optical modem in the topside communication hub 300 and one active optical modem in the subsea communication hub 28. In each of the topside communication hub 300 and subsea communication hub 28, a cold-standby algorithm is executed by a processor 504 (in hub 300) and a processor 510 (in hub 28) that leaves one of the modems in each hub in the standby mode or powered off mode.

Each modem uses a wavelength division multiplexing (WDM) algorithm to allow four modems, two topside and two subsea, to communicate on the same optical fiber 508. Alternatively, multiple fibers are provided within the umbilical to provide for redundancy in case of connector failure or fiber darkening, although only one is required for full system functionality.

Optical fiber selection is provided by optical circuitry 502 (in topside hub 300) and optical circuitry 514 (in subsea hub 28). The optical circuitry 502 and 514 include splitters and switches to provide appropriate routing of signals.

In the redundancy configuration of FIG. 9, four levels of redundancy are provided. In another embodiment, greater redundancy can be accomplished by providing a greater number of redundant modems and/or fibers.

At preset time intervals, the processor 510 and/or processor 504 powers up the optical modems 500, 506, 512, and 518 into a test mode to determine the optical signal intensity between each of the combinations of surface and subsea modems and on each of the available optical fibers. The processor 510 then chooses which modem pair is most beneficial to use as the primary modems, and this configuration will be kept operational while the other modems are powered down into standby mode.

As shown, the processor 504 in the topside communication hub 300 provides control signals to the optical circuitry 502 and to modems 500 and 506. The control signals to the modems 500 and 506 cause the modems to be powered on, powered off, or set in a standby mode. The control signals to the optical circuitry 502 selects one of the modems 500 and 506 to use, and to select one of multiple fibers to use.

Thus, according to some of the embodiments of the invention, the likelihood of failures of the optical communication system is reduced by using optical modems that are capable of variable optical intra-modem data rates. At least one of the optical modems is capable of self-monitoring and self-selecting the data rate to compensate for increased attenuation resulting from operation in a subsea environment for extended time periods. Moreover, according to some embodiments, to further reduce the likelihood of failure, a dual-redundant optical modem configuration that is capable of self-testing each combination of modems and optical fibers is provided. In this dual-redundant optical modem configuration, the active pair of modems is selected based on predetermined criteria, while the remaining pair is left in an off or standby mode to extend the life of those modems.

Figure 10:
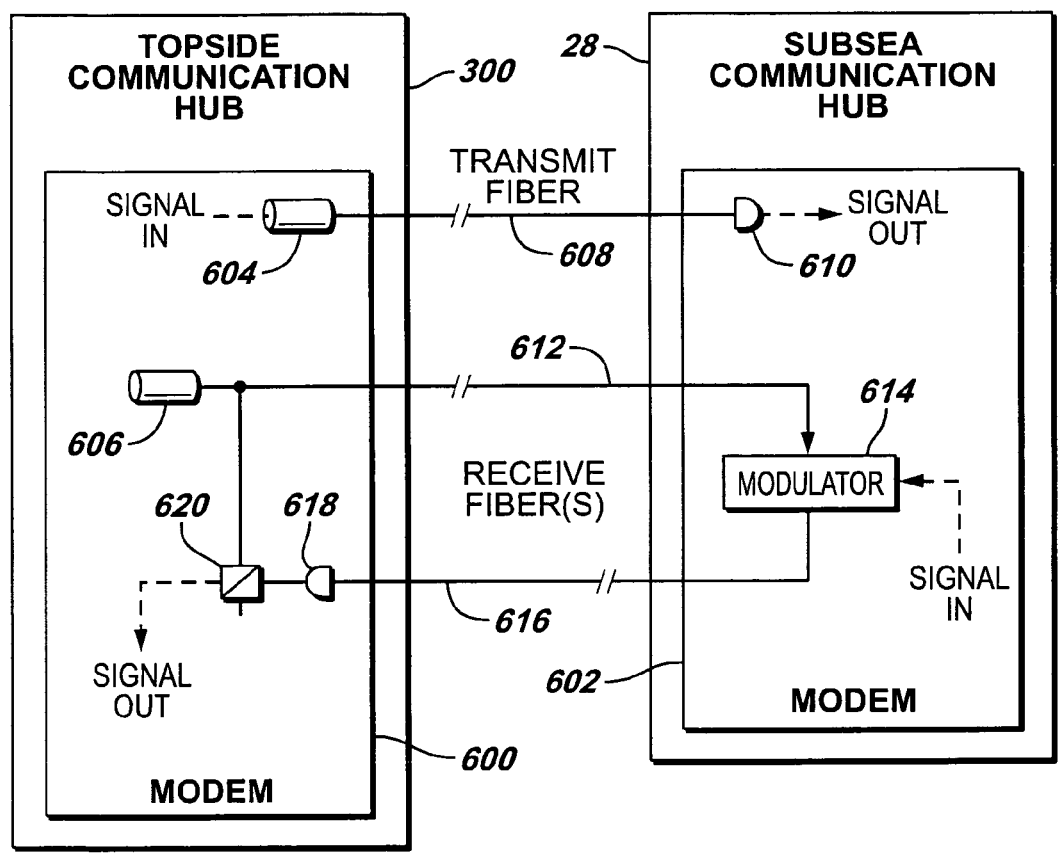
FIG. 10 is a block diagram of another embodiment of a fiber optic communication system.

An optical modem is a sensitive component that is subject to failure, especially in harsh operational conditions such as a subsea environment. If the optical modem fails in the subsea communication hub 28, replacement of the optical modem is a time-consuming and expensive task. Also, the umbilical that connects the topside and subsea communication hubs can be cost prohibitive and may not be feasible for a given subsea application. Thus, according to some embodiments of the invention, a modem in the subsea communication hub 28 is used that does not have a fiber optic laser. This arrangement is shown in FIG. 10.

The topside communication hub 300 includes a topside fiber optic modem 600, while the subsea communication hub 28 includes a remote device 602. The topside modem 600 includes two fiber optic lasers 604 and 606, instead of the single fiber-optic laser in the topside modem 400 of FIG. 7. The fiber optic laser 604 receives a signal input and transmit optical signals down a transmit fiber 608 to a receiver 610 in the remote device 602. The receiver 610 produces an output signal based on the received optical signals. This transmit path from the topside modem 400 to the remote modem 402 is similar to the transmit path including the laser 404, transmit fiber 406, and receiver 408 of FIG. 7.

However, in a departure from the arrangement of FIG. 7, a looped fiber optic path is employed for the receive path (from the remote modem 602 to the topside modem 600). The laser 606 transmits an optical signal down a first portion of the receive fiber 612. The output of this first portion 612 of the receive fiber is coupled to a modulator 614, which modulates the optical signals received down the optical fiber portion 612 based on an input signal from the subsea communication hub 28. The modulator 614 provides the modulated optical signal over a second portion 616 of the optical fiber, which is provided to a receiver 618 in the topside modem 600 at the topside communication hub 300. The output of the receiver 618 is compared to the original optical signal of the laser 606 by a comparator 620. Based on this comparison by the comparator 620, the information corresponding to the input signal received by the modulator 614 at the subsea communication hub 28 can be derived and provided as an output to the topside communication hub 300.

Note that the optical fiber portions 612 and 616 can be made up of either two separate fibers or one continuous fiber. In either case, the combination of the fiber optic portions 612 and 616 provides looped fiber optic path. Also, the transmit fiber 608 can also be part of the same fiber.

The modulator 614 employed can either be an electro-optic or an acousto-optic modulator. The modulator 614 can be placed on the same electronics board as the processor of the subsea communication hub 28. Although not shown, the optical signal provided from the modulator 614 can be boosted by an optical amplifier or booster at the remote device 602 to allow for longer distances between the control system 600 and the remote device 602.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use with a subsea well, comprising:
   providing a subsea communication module;
   coupling, using a communications link, the subsea communication module to surface equipment;
   receiving, at the subsea communication module, data from at least one sensor associated with the subsea well; and
   sending, from the subsea communication module to the surface equipment, the received data in Internet Protocol packets over the communications link.

2. The method of claim 1, wherein receiving the data from the sensor comprises receiving the data from a sensor located proximate a seabed.

3. The method of claim 1, wherein receiving the data from the sensor comprises receiving the data from a sensor located downhole in a subsea well.

4. The method of claim 1, wherein providing the subsea communication module comprises providing the subsea communication module as part of subsea wellhead equipment.

5. The method of claim 1, wherein providing the subsea communication module comprises mounting the subsea communication module to the subsea wellhead equipment.

6. The method of claim 5, wherein mounting the subsea communication module to the subsea wellhead equipment comprises mounting the subsea communication module using a remote-operated vehicle.

7. The method of claim 1, further comprising:
   receiving, at the communication module, a control command in one or more packets over the communications link from the surface equipment; and
   sending the control command to at least one control device associated with the subsea well.

8. The method of claim 7, wherein sending the received data in packets and receiving the control command in the one or more packets is performed by an interface to a fiber optic link, the communications link comprising the fiber optic link.

9. The method of claim 7, further comprising decapsulating the one or more packets to extract the control command.

10. The method of claim 9, wherein decapsulating the one or more packets is performed by a Transmission Control Protocol/Internet Protocol stack in the subsea communication module.

11. The method of claim 1, wherein providing the subsea communication module comprises providing a module having a container sealed from outside sea water, wherein electrical components are provided in the container.

12. The method of claim 11, further comprising:
coupling the subsea communication module to sensors associated with multiple subsea wells; and
receiving data, at the subsea communication module, from the sensors associated with the multiple subsea wells.

13. The method of claim 1, further comprising coupling plural subsea communication modules to the communications link.

14. The method of claim 13, further comprising coupling plural devices to each subsea communication module, the devices including at least one of sensors and control devices.

15. The method of claim 14, wherein at least some of the sensors and control devices are network-enabled, the method further comprising:
a remote host accessing the network-enabled sensors and control devices using Internet Protocol communications.

16. The method of claim 15, the remote host communicating with the network-enabled sensors and control devices using Internet Protocol addresses of the network-enabled sensors and control devices.

17. The method of claim 13, further comprising controlling input/output tasks of a first one of the subsea communication modules by a second one of the subsea communication modules in case of failure of a processor of the first one of the subsea communication modules.

18. The method of claim 13, further comprising dividing a task into plural portions for concurrent execution by the subsea communication modules.

19. The method of claim 1, further comprising performing real-time monitoring of the at least one sensor.

20. The method of claim 1, wherein providing the subsea communication module comprises providing the subsea communication module separate from components providing for well control of the subsea well.

21. The method of claim 20, further comprising removing the subsea communication module without affecting well control.

22. The method of claim 1, further comprising encrypting communications over the communications link.

23. The method of claim 1, further comprising the subsea communication module performing tasks in response to triggering events.

24. The method of claim 1, further comprising providing a separate, wireless link between the subsea communication module and the surface equipment as a redundant link.

25. The method of claim 1, wherein receiving the data from the at least one sensor comprises receiving Internet Protocol packets from the at least one sensor over a link that couples the subsea communication module and the at least one sensor.

26. The method of claim 1, further comprising:
coupling an acoustic link between the subsea communication module and the surface equipment; and
selecting the acoustic link by the subsea communication module to communicate with the surface equipment if the communications link fails.

27. The method of claim 1, further comprising providing a redundant, wireless link that is selected for communications between the subsea communication module and the surface equipment if the communications link fails.

28. A system for use with a subsea well, comprising:
surface equipment;
a subsea communication module having an interface; and
a communications link coupling the surface equipment to the subsea communication module, the interface of the subsea communication module to communicate with the surface equipment over the communications link according to an Internet Protocol.

29. The system of claim 28, wherein the subsea communication module includes a connector to receive data from a sensor associated with the subsea well.

30. The system of claim 28, further comprising subsea wellhead equipment, wherein the subsea communication module is mounted to the subsea wellhead equipment.

31. The system of claim 30, further comprising a remote operated vehicle to mount the subsea communication module to the subsea wellhead equipment.

32. The system of claim 28, wherein the interface of the subsea communication module is adapted to receive a control command in one or more Internet Protocol packets over the communications link from the surface equipment, and the subsea communication module includes another interface to send the control command to at least one control device associated with the subsea well.

33. The system of claim 28, wherein the communications link comprises a fiber optic link, and the subsea communication module comprises a fiber optic modem.

34. The system of claim 28, wherein the communications link comprises an electrical line.

35. The system of claim 28, wherein the subsea communication module comprises a Transmission Control Protocol/Internet Protocol stack.

36. The system of claim 28, wherein the subsea communication module comprises a container sealed from outside sea water, wherein electrical components are provided in the container.

37. The system of claim 28, wherein the surface equipment comprises a sea vessel.

38. The system of claim 28, further comprising another subsea communication module coupled to the communications link.

39. The system of claim 38, further comprising sensors and control devices, wherein each subsea communication module is coupled to at least one of a sensor and control device.

40. The system of claim 39, wherein at least one of the sensors and control devices is network enabled to allow network access of the at least one of the sensors and control devices over the communications link.

41. The system of claim 40, wherein each subsea communication module includes a processor, wherein the processor of one subsea communication module is able to take over processor tasks of another subsea communication module if failure of the processor of the another subsea communication module occurs.

42. The system of claim 28, wherein the subsea communication module includes a storage to store data received from a sensor.

43. The system of claim 28, further comprising an acoustic link between the subsea communication module and the surface equipment, the acoustic link selected by the subsea communication module to communicate if the communication link fails.

44. The system of claim 28, further comprising a subsea production control system that is separate from the subsea communication module.

45. The system of claim 44, wherein the subsea communication module is removable without affecting well control operations performed by the subsea production control system.

46. The system of claim 44, wherein the subsea production control system and the subsea communication module communicate over the communications link over different wavelengths.

47. The system of claim 28, wherein the surface equipment is adapted to perform real-time operations in the subsea well based on communications over the communications link.

48. The system of claim 28, further comprising a sensor for positioning downhole in the subsea well, the subsea communication module to receive data from the sensor.

49. The system of claim 28, further comprising a sensor to communicate Internet Protocol packets with the subsea communication module.

50. A subsea communication module comprising:
   a first interface to at least one of a sensor and a control device associated with a subsea well;
   a second interface to a communications link to be coupled to surface equipment; and
   a controller to process data,
   wherein the second interface is adapted to communicate over the communications link according to an Internet Protocol.

51. The subsea communication module of claim 50, wherein the second interface comprise an optical modem.

52. The subsea communication module of claim 50, wherein the second interface comprises an Internet Protocol layer.

53. The subsea communication module of claim 52, wherein the second interface comprises a Transmission Control Protocol/Internet Protocol stack.

54. The subsea communication module of claim 50, the first interface to communicate Internet Protocol packets to at least one of a sensor and control device.

55. The subsea communication module of claim 50, further comprising a third interface to an acoustic link,
   wherein the controller selects the acoustic link to communicate with the surface equipment if the communications link fails.

56. The subsea communication module of claim 50, further comprising a third interface to a wireless link,
   the controller to select the wireless link for communications with the surface equipment if the communications link fails.

* * * * *